United States Patent

[11] 3,604,611

| [72] | Inventor | John Lamberty<br>Des Plaines, Ill. |
|---|---|---|
| [21] | Appl. No. | 789,562 |
| [22] | Filed | Jan. 7, 1969 |
| [45] | Patented | Sept. 14, 1971 |
| [73] | Assignee | Dee Electric Company<br>Chicago, Ill. |

[54] SOLDERING APPARATUS
12 Claims, 7 Drawing Figs.

[52] U.S. Cl.............................................. 228/36,
29/471, 29/626, 219/392, 228/37
[51] Int. Cl................................................. B23k 1/08
[50] Field of Search........................................... 228/36, 37;
219/392, 413; 29/625, 495, 471

[56] References Cited
UNITED STATES PATENTS

| 2,770,875 | 11/1956 | Zimmerman.................. | 29/503 |
| 3,082,520 | 3/1963 | Hepner.......................... | 228/37 X |
| 3,092,059 | 6/1963 | Tesch, Jr. ..................... | 228/37 |
| 3,218,193 | 11/1965 | Isaacson........................ | 228/37 X |
| 3,386,166 | 6/1968 | Tardoskegyt.................. | 29/625 |
| 3,421,211 | 1/1969 | Eaves et al..................... | 228/37 X |
| 3,482,755 | 12/1969 | Raciti............................ | 228/37 X |

*Primary Examiner*—John F. Campbell
*Assistant Examiner*—R. Craig
*Attorney*—Alter, Weiss & Whitesel ABSTRACT: Automatic soldering apparatus that can be used for soldering printed circuit boards, or the like, of various sizes without using pallets for transporting the boards between stations on the machine. Means are provided for varying the distance between the conveyor means used in transporting the boards between processing stations of the apparatus. Further means integral with the stations are provided for protecting the conveyors from solder and solder flux. The machine also provides means for energizing only those sections of the stations that are in use as determined by the size of the boards being processed. The improved apparatus further includes unique preheating arrangements.

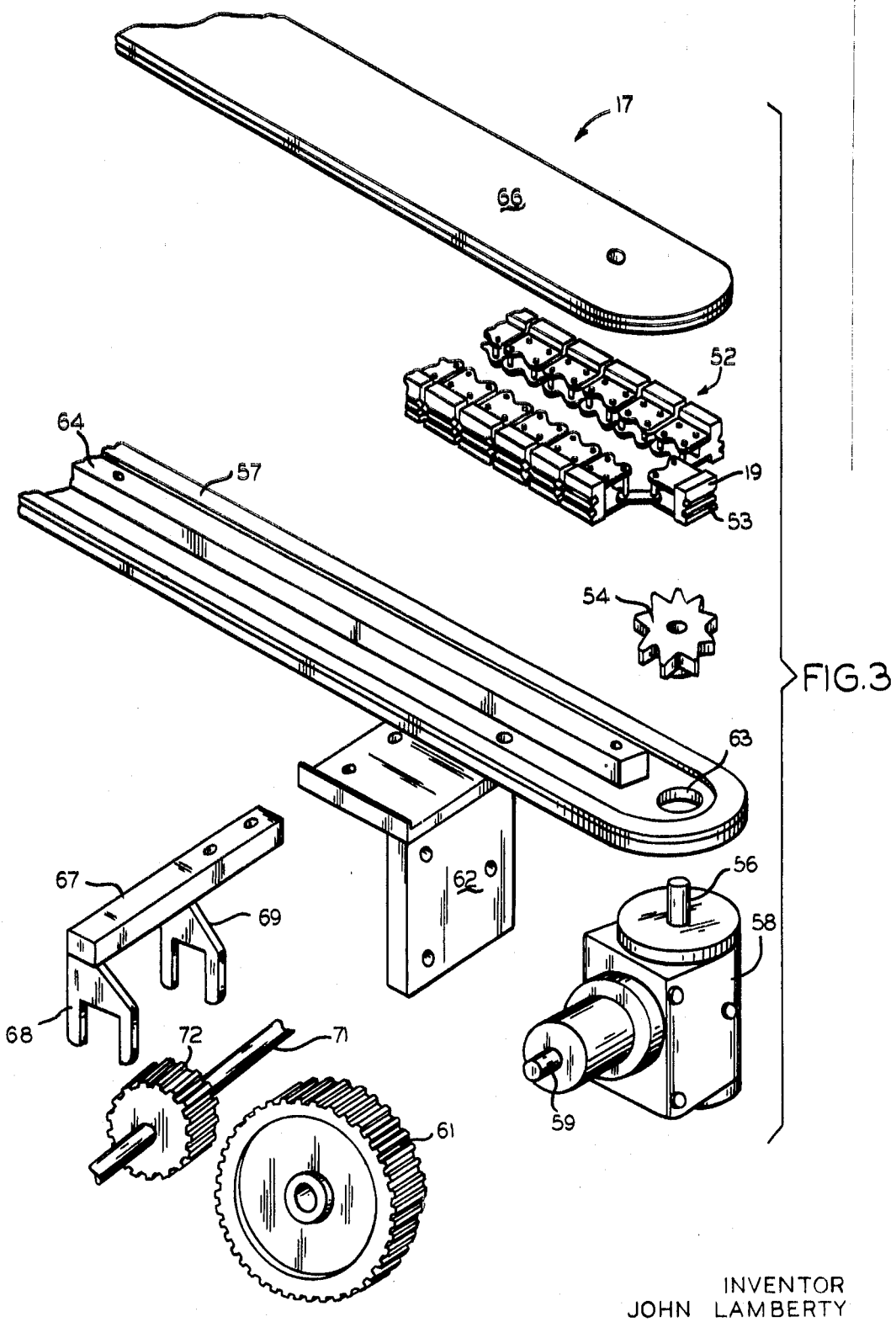

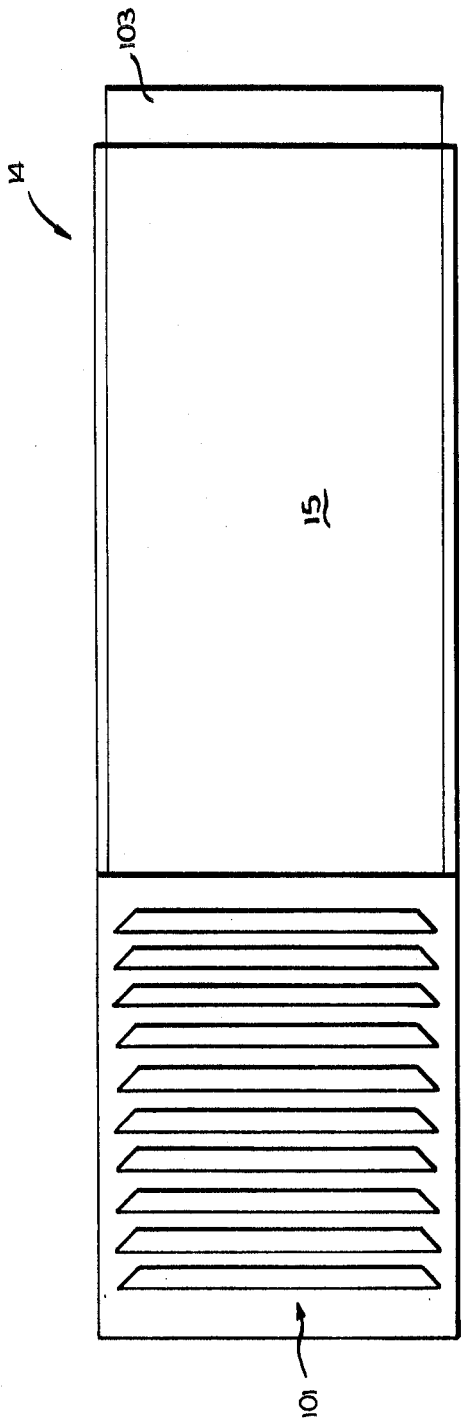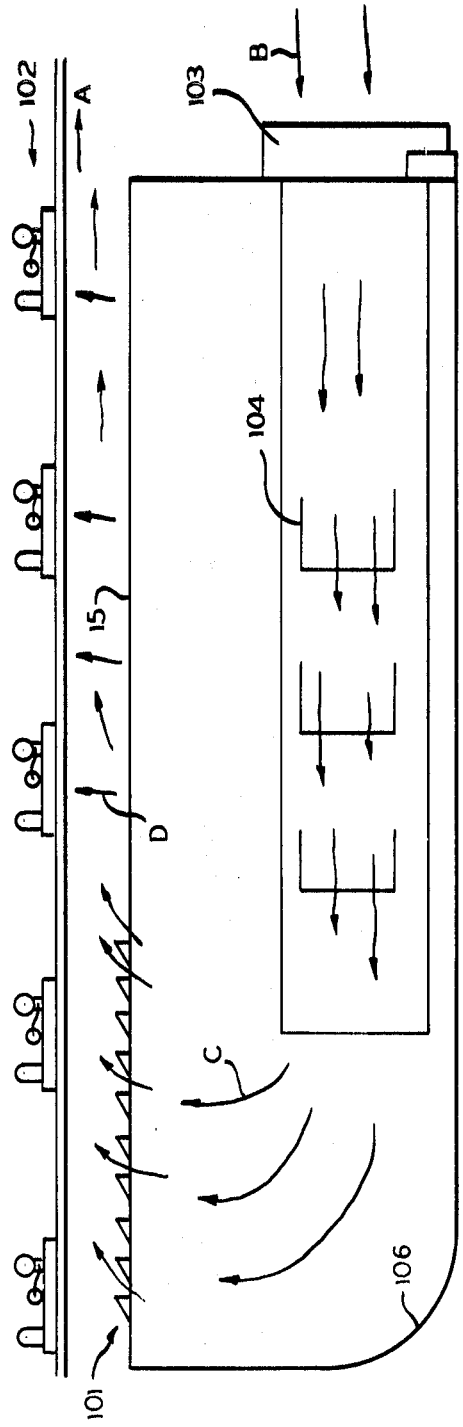

SOLDERING APPARATUS

This invention relates to automatic soldering apparatus and more particularly, to automatic soldering machines having a plurality of processing stations.

The automatic soldering machines presently available on the commercial market generally comprise stations where the different related operations are performed on printed circuit boards, or the like. The boards are transported from station to station by well-known conveyor chain means wherein the conveyor comprises a pair of endless chains disposed on opposite sides of said stations. Pallets, or the like, may depend from the oppositely disposed chains for use in transporting the boards.

A station is provided for applying the solder to the boards. Generally at this station soldering equipment is provided wherein molten masses of solder are continuously elevated in the forms of waves or the like. At this station at least the portion of the board which has components thereon requiring soldering passes through the elevated molten solder.

The boards generally pass through flux stations prior to the solder station. Solder flux is automatically applied to the boards at the flux station. Between the flux station and solder station preheating stations are located. The operation of the soldering apparatus has been found to be greatly improved when the flux boards are preheated prior to soldering.

The printed circuit boards that are processed on the available soldering machines may be of different sizes. To assure that the soldering machines are amenable to process a maximum number of all of the different sizes the machines are manufactured to accommodate large-size boards. This is generally accomplished by controlling the dimension between the conveyor chains which run laterally through the length of the machine on both sides of the stations.

There are soldering machines available which provide for gripping the boards between the chains in various manners. One such machine is disclosed in U.S. Pat. application, Ser. No. 610,527, which was filed on Mar. 31, 1967 and is assigned to the assignee of this invention. There are also soldering machines available which provide pairs of oppositely disposed conveyors wherein the distance between the conveyors is variable making it possible to accommodate boards of different sizes.

Many of the presently available automatic soldering apparatus having variably spaced conveyors do not provide means for adjusting the space between the conveyors. Those which do provide for adjusting the space between the conveyors use inefficient or wasteful means for protecting those parts of the conveyors which are located over the stations.

Another related problem in handling the various and sundry sizes of printed circuit boards is the fact that when a smaller printed circuit board is used, the same amount of power is used in heating and processing the solder, the flux and the preheaters at the various stations for the small- size boards as is used in processing the larger boards. Thus, the presently available machines are inefficient in the use of power and also wasteful in the use of solder and solder flux.

Yet another problem encountered with the presently available soldering machines is in the preheating station. For example, the fact that the heat is directed only normally to boards minimizes the exposure time of the boards to the heat, thereby requiring higher heating temperatures.

Accordingly, an object of this invention is to provide new and unique soldering apparatus that does not require the use of pallets for transporting the paraphenalia, such as printed circuit boards being soldered, and provides means for automatically varying the distance between the spaced-apart conveyor units used in transporting components being soldered through the machine over the various stations on the machine while efficiently protecting the conveyor sections that are located directly over the station by masking those portions of the stations which are not in use because, for example, the components being processed are smaller than the largest size articles which the machine is capable of processing.

Still another object of this invention is to provide means for controlling the power expenditure of the stations in accordance with the size of the articles, such as printed circuit boards being processed at the stations.

Yet another object of this invention is to provide a preheater station which directs heat at the boards both normally and tangentially.

A preferred embodiment of the invention comprises automatic soldering apparatus having a plurality of stations for processing printed circuit boards, or the like. A pair of oppositely disposed conveyor chain assemblies are mounted on either side of the stations and run laterally throughout the length of the machine. Means are provided for adjusting the distance between the conveyor chain assemblies so that in conjunction with carrier lugs mounted on the conveyor chain assemblies, boards of different sizes can be held between the two pairs of conveyor chains. Pallets or board carriers may be used if desired. The stations themselves are selectively provided with means for masking portions thereof. The masking can be cooperatively associated with the movable conveyors.

Further means are provided for automatically controlling the power provided so that only those portions of the stations that are used based on the size of the boards being soldered are energized.

The preheat station is provided with means for directing heat toward the board so as to strike the board at a variety of angles ranging from tangential to normal.

The above-mentioned and other objects of this invention together with the manner of obtaining them will become more apparent and the invention itself will be best understood by making reference to the following description of an exemplary embodiment of the invention taken in conjunction with the accompanying drawings wherein:

FIG. 3 is an exploded pictorial view of a movable one of the pair of oppositely disposed conveyor chain assemblies;

FIG. 6 is a top view of the inventive preheating station; and

FIG. 7 is a sectional schematic representation of the preheating station of FIG. 6.

Figure 1:
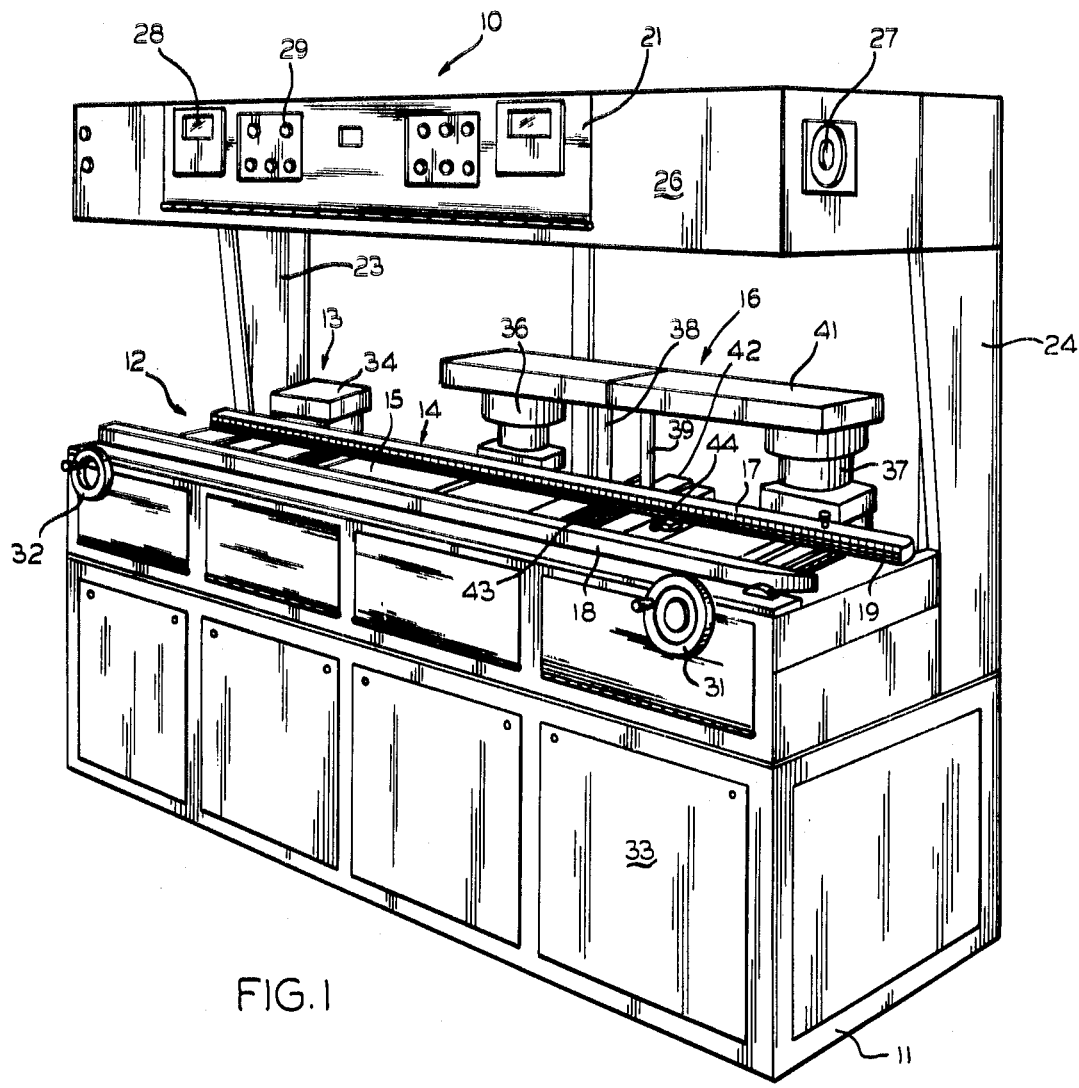
FIG. 1 shows a pictorial view of a preferred embodiment of an assembled automatic soldering machine having the inventive features.

Similar characters of reference are used to indicate corresponding parts and features throughout the several views. Referring now to the same, the character 10 generally shows an assembly improved soldering apparatus or machine in FIG. 1. The assembly as shown in FIG. 1 has a base section 11. The base section 11 houses the electrical control components (not shown) such as transformers and the like. The top of the base section provides the working surface of table portion 12 of the assembly. The table portion 12 is divided into stations where various processes are performed on the circuit boards or the like, that are being soldered. The stations indicated in FIG. 1 are generally a fluxing station 13, a preheating station 14 and a soldering station 16.

Shown disposed on both sides of the stations are a pair of conveyor assemblies made up of conveyor chain assemblies 17 and 18. The conveyor chain assemblies extend longitudinally across the entire table and are disposed at opposite sides of the stations. The conveyor chain assemblies 17 and 18 each include means for holding printed circuit boards, or the like, such as lug 19 shown in FIG. 1 coupled to the continuous chains of the conveyors.

A control panel 20 is shown mounted from two standards 23, 24 above table 12. The control panel 20 is shown included in a hood 26 which acts to capture and dispose of vapors escaping from the stations of the table 12. The captured vapors are expelled through means, such as vapor outlet 27 which usually includes fan means and may be vented to the outside through any well-known venting means not shown herein. The control panel 21 comprises various gauges and control knobs, such as temperature gauge 28 and control knob 29. The controls are used for varying temperature ranges and the like.

Means are provided for varying the distance between the oppositely disposed pair of conveyor chain assemblies 17 and 18. The means shown are actuated by and include the adjusting wheels 31 and 32 mounted at opposite ends of the machine. The wheels 31 and 32 may be coupled together in any well-known manner. The precise distance varying means actuated by adjusting wheels 31 and 32 is described in detail hereinafter. It should be noted that the machine is preferably equipped with readily removable panels covering the base sections. These readily removable panels, such as panel 33, enable easy access for cleaning or servicing components mounted within the base section 11 including the coupling means between wheels 31 and 32.

The details of the various stations which are pertinent to this invention will be described further in the specification. However, for now, suffice it to say that at station 13 there are means for continuously circulating flux and for applying the flux to boards being processed. For example, a motor is shown depicted by block 34. The motor 34 is used to drive a fluxer pump (not shown).

Station 14 comprises means such as hotplates 15 to generate heat sufficient to preheat the passing boards and air directing baffles for directing hot air at the boards from a variety of angles. The hotplates are generally provided with heating elements which can be, in effect, partially controlled so that selected portions of the preheater are energized.

Similarly, in this preferred embodiment, the solder equipment of station 16 is provided with means for recirculating molten solder and for applying the solder to the boards. As shown in FIG. 1, station 16 is provided with a pair of motors 36 and 37. The motors are shown linked to pump shafts 38 and 39, respectively, through belt or chain linkages covered by hood assembly 41. Of course, this invention is not limited to a solder-wave device which requires two solder pumps for generating a pair of waves. Instead, any type of soldering equipment that can be used automatically within this machine is envisioned for use within this inventive assembly. Station 16 further is shown as provided with the well-known solder pot 42 having an orifice 43 therein.

Means are provided for controlling the power used to energize the various stations so that only those portions of the stations are energized which are used as depicted by the size of the printed circuit board being processed. More particularly, such means may be a switch such as lever-actuated switch 44 which is operated by the movement of the movable conveyor chain assembly 17 against the lever of the switch. Thus, when the conveyor chain assembly 17 is moved closer to conveyor chain assembly 18 to enable processing a smaller printed circuit board, then the operating lever or arm of switch 44 is actuated to open the switch and remove power from portions of the heating elements, or the like, in the various stations.

Figure 2:
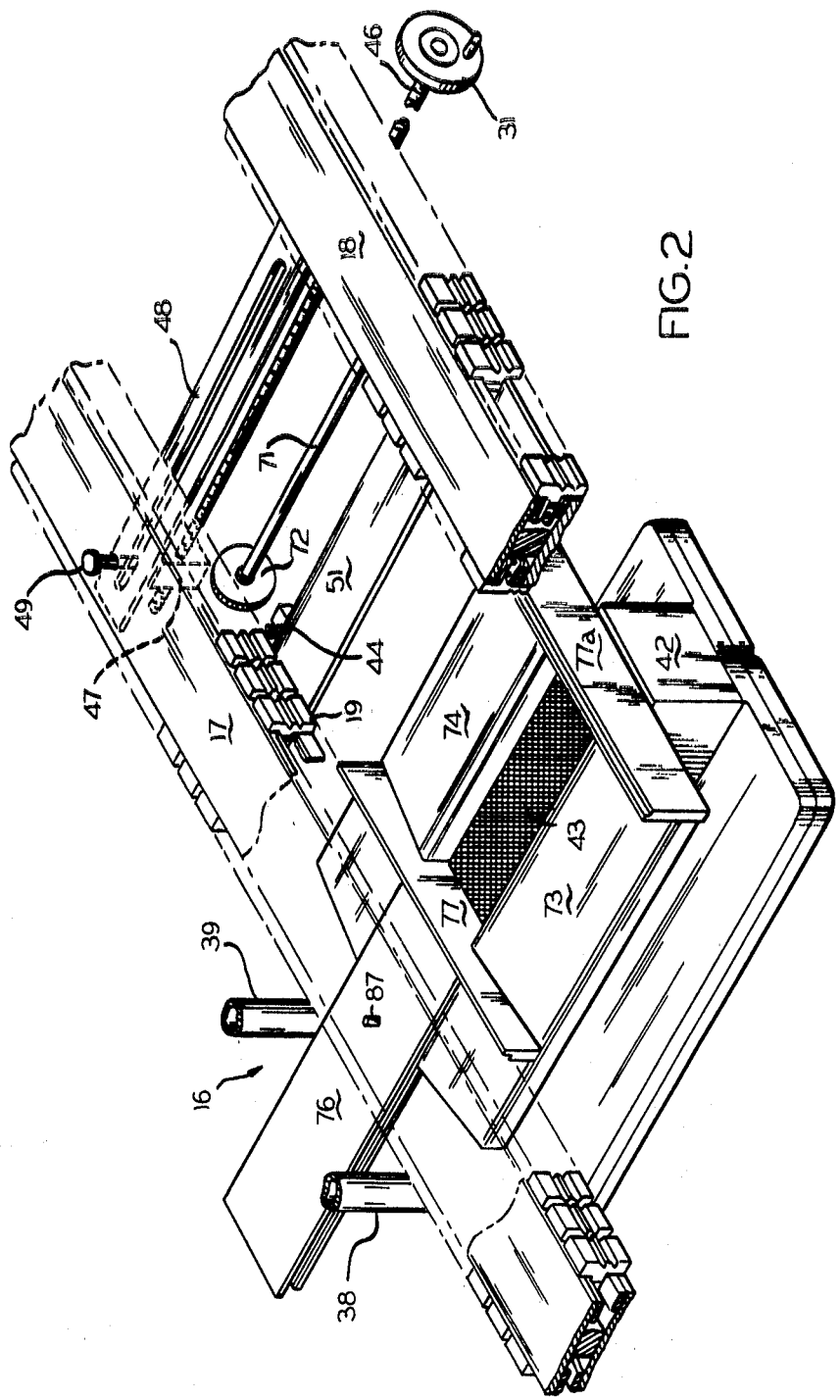
FIG. 2 is a pictorial view of the soldering station of the machine of FIG. 1 showing the oppositely disposed pair of conveyor chains, the various controls and linkages used for adjusting the distance between the conveyors and also showing the protecting masking assembly associated with the soldering orifice.

The means which are provided for adjusting the distance between the conveyor chain assemblies is shown most particularly in FIG. 2. As shown therein, the adjustment wheel 31 is fixedly attached to a threaded rod 46. A 10 carrier element 47 is threaded onto rod 46. The threaded rod 46 with the carrier element thereon is shown mounted beneath a slotted crossmember 48.

Means are provided for coupling the conveyor assembly 17 to the carrier 47. More particularly, the top of carrier 47 has a threaded hole therein for receiving the threaded portion of thumbscrew 49. The threaded portion of thumbscrew 49 slip fits through a hole in assembly 17 and threads into the threaded hole on top of carrier 47. Thus, turning wheel 31 causes threaded rod 46 to turn and carrier 47 is forced to move on the threaded rod 46. Since carrier chain assembly 17 is fixedly attached by thumbscrew 49 to carrier 47, the chain assembly is also forced to move under the control of wheels 31. The direction of movement is toward or away from the fixed carrier depending on whether wheels 31, 32 are turned in a clockwise or counterclockwise direction.

FIG. 2 illustrates the switch 44 attached to crossmember 51 which has a flat surface thereon for supporting the movable carrier chain assembly 17 as it is moved transversely across the face of table 10. Thus, as the assembly 17 is moved into contiguous relation with the operating lever of switch 44, the switch is connected to open power circuits to portions of the heater at assembly station 14, for example.

It should be noted that the operation of wheel 31 causes wheel 32 to move in the same direction, since they are coupled together by any well-known means (not shown). Any number of such control could be mounted on the machine within the scope of the invention. Thus, a single control wheel could be used or a plurality of the adjustment wheels can be used.

Means, as best seen in FIG. 3, are provided for driving the endless chain 52 of the movable conveyor chain assembly 17 regardless of the assembly's transverse position on table 10. The continuous chain is shown horizontally disposed and has mounted on each of the links a chain lug such as lug 19. Each of the lugs such as lug 19 is shown as having a pair of slotted openings, such as slots 53, 53a for receiving the printed circuit boards. That is, the printed circuit boards being processed are slipped into either slots 53 or slots 53a on opposite conveyor chain assemblies. There is sufficient clearance in the corresponding slots on the oppositely disposed conveyor chain assemblies to enable the chains to accommodate tolerances on the board sizes. The chain 52 is driven by means such as chain sprocket gear 54 mounted on a vertically disposed shaft 56 which extends through conveyor rail 57. A similar gear (not shown) is mounted on the far side of the conveyor chain rail. Shaft 56 is a part of a miter gear box assembly 58 which is used to transfer the drive forces through a right angle.

Mounted on the corresponding right angle axle 59 of the miter gearbox 58 is a driven gear 61. A miter gear box support bracket 62 is provided for mounting the miter gear box to the conveyor chain rail 57 to enable axle 56 to pass through aperture 63 in rail 57. The chain rail 57 is shown as having a spine portion 64 around which the chain passes, and which supports a cover plate 66. The support bracket 62 and the miter gearbox 58 are assembled together using any well-known fasteners (not shown). The driven gear 61 is thus fixedly attached to rail 57 and thus moves along with the complete conveyor chain assembly 17 whenever it is moved.

Means are provided for applying turning forces to the driven gear 61 irrespective of the transverse position of the conveyor chain assembly. Thus, means such as a driving-gear-positioning bracket 67 is provided. The positioning bracket 67 is attached to the conveyor assembly either at support bracket 62 or at any other convenient place.

Downwardly disposed from and part of bracket 67 are a pair of inverted U-shaped legs spaced apart from each other, such as legs 68 and 69. The inverted U-shaped opening of the leg fits around a drive shaft 71. Attached to the drive shaft 71 is a drive gear 72. The gear 72 is keyed onto the shaft in such a manner that it can slide along the length of the shaft but is turned by the rotational motion of the shaft. Consequently, as the assembly 17 is moved, the bracket 67 with depending legs 68, 69 forces drive gear 72 to move to maintain its contiguous meshing relationship with driven gear 61. Thus, regardless of where assembly 17 is moved, the chain therein is still driven by drive shaft 71 through gears 72 and 61. Drive shaft 71 is driven in any well-known manner to cause the turning of chain 52 synchronized with the movement of the chain assembly 18, to transport solder boards coupled within the slots of corresponding lugs on oppositely disposed chains of assembly 17 and 18.

Means integral to the individual stations are provided for shielding the chain assembly as it moves across portions of the various stations of the machine and also for protecting those portions of the stations that are not being used.

More particularly, a sliding masking assembly is used to cover those portions of the solder-pot orifice and the fluxer which are not being utilized when the smaller size boards are being processed. More particularly, as shown in FIG. 2, the wave-soldering arrangement comprises a solder pot 42 and an orifice 43. Pumps 38 and 39 force two waves of solder to rise through the orifice 43 and flow over skirts 73 and 74 in opposite directions and back into the outer tank of the wave-soldering equipment. It should be noted that for convenience, the outer tank is not shown; instead only the bottom of the tank is shown in FIG. 2.

Figure 4:
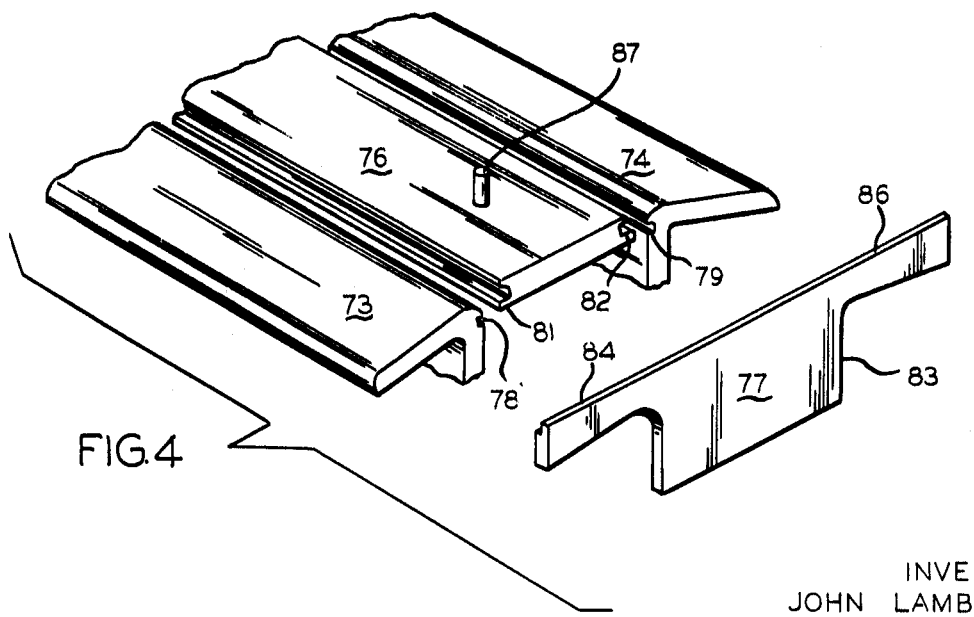
FIG. 4 is an exploded pictorial view of a masking assembly used in conjunction with the soldering orifice station.

A masking assembly comprising a sliding masker 76 and a frontpiece 77 attached thereto in any well-known manner is shown in FIGS. 2 and 4. As shown in the exploded view of FIG. 4, the sliding masker 76 is designed to fit into slots 78, 79 of the skirted sides 73, 74 respectively of the inner solder pot. More particularly, sliding masker 76 has a bottom flange thereon, such as flanges 81 and 82 designed to slidingly mesh into slots 78 and 79 on the sides of the solder pot.

Attached to the front of the sliding masker in any well-known manner is vertical plate 77. A corresponding plate 7ua (FIG. 2) is mounted at the opposite end of the orifice. The vertical plate 77 is substantially a T-shaped arrangement having a main body portion 83 and two wing portions 84 and 86 designed to fit contiguously to the top of the skirt sections 73 and 74 respectively. Thus, when the waves are generated by the pumps in the solder pot, the waves are prevented from washing over the skirted sections behind vertical plate 77 by wings 84 and 86. Similarly, no waves tend to rise behind frontpiece 77 because of sliding masker 76. Vertical plate 77a on the opposite side of the orifice effectively dams that side of the orifice. Thus, the vertical plates act as limiting factors on the heights of the waves. Provisions are made for using higher vertical plates when larger amplitude waves are to be generated.

In FIG. 2 the machine is shown in its turned-off condition. Thus, hardened solder is illustrated in orifice 43.

A threaded pin such as pin 87 is shown fixed into sliding masker 76. The pin is designed to fit into a corresponding aperture in the conveyor chain assembly 17 so that when the conveyor assembly is moved it forces the sliding masker to move a corresponding amount. Movement of the sliding masker would also occur without the pin. That is, the sliding masker would be forced inward as the chain assembly 17 abuts frontpiece 77. Thus, the chain assembly 17 can be attached to the sliding masker arrangement 76 with a pin 87 or with any other means known to the art. Alternatively, the conveyor chain assembly 17 can merely be juxtaposed to sliding masker 76. The masking arrangement can, of course, be moved independently of the conveyor.

A similar masking arrangement may also be provided to cover a portion of the fluxing assembly station that is not being used. That is particularly shown in FIG. 5 where the fluxing arrangement of station 13 is shown in some detail.

Figure 5:
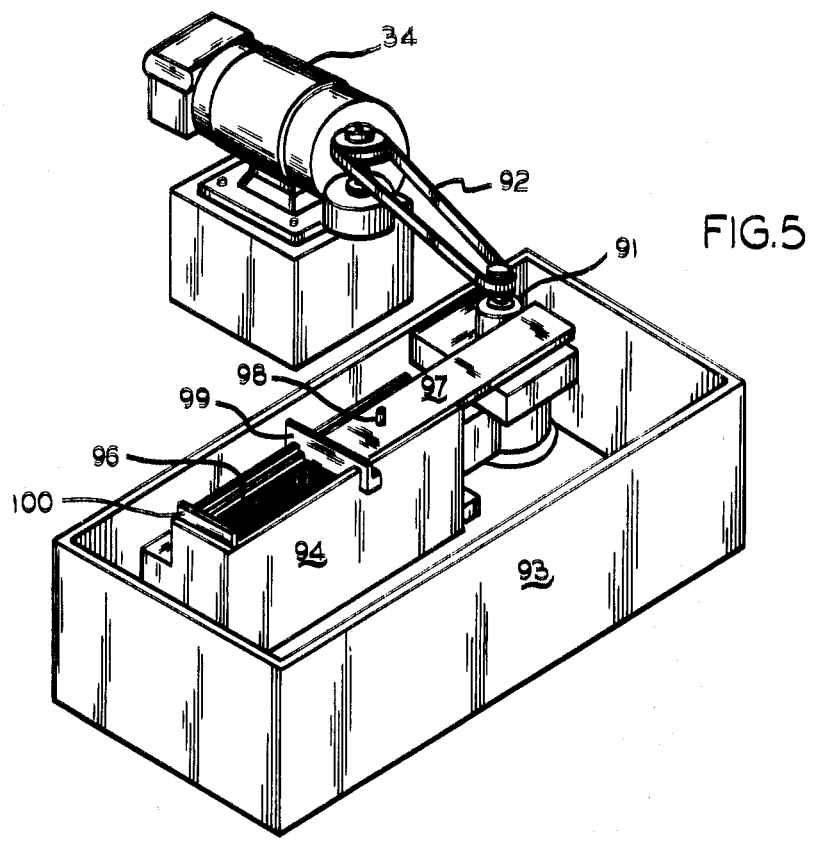
FIG. 5 is a pictorial view of a typical fluxing station used on the inventive soldering machine.

In FIG. 5 drive motor 34 is shown belt-coupled to solder flux pump 91 through coupling means such as belt 92. The pump 91 is placed within an outer flux tank 93. The outer flux tank is filled with a fluid-fluxing material. An inner tank orifice 94 is provided. The pump forces the fluxing material through the orifice 94 and over the screen 96 provided at the mouth of the orifice tank 94. A sliding masker 97 is provided which cooperates with the orifice of the fluxer similarly to the cooperation of masker 76 with orifice 43 of the wave-solder pump. Thus, a pin, such as pin 98, may also be provided for assuring the cooperation of the movable conveyor chain assembly 17 and masker 97. Masker 97 is also provided with a vertical plate 99 corresponding to frontpiece 77 and also attached in any well-known manner. The opposite side of the fluxer is equipped with vertical plate 100 which is dimensioned to correspond with plate 99.

It should be noted that the lugs on the carrier chain are shown as having a pair of vertically displaced slots. Different ones of the slots are used depending on the height of the solder wave being used. Thus, means such as the vertically displaced slots are provided for accommodating the components thereon to assure that the boards pass through the flux and the solder so that the right amount of flux and solder are disposed upon the boards. For example, when the masking equipment is used to diminish the size of the orifice and larger amplitude waves are formed, then the topmost slots would be used to hold the boards. Similarly, vertical plates are designed to contain the higher waves.

The preheater arrangement of the improved automatic soldering apparatus comprises means for causing heat to impinge on the boards from a variety of angles simultaneously. More particularly, means such as baffles or vanes 101 (FIGS. 6 and 7) are provided for causing convection currents to flow tangentially to the boards in the direction of movement of the boards. Further, means comprising hotplate 15 are provided for directing radiant heat and convection currents perpendicular to the boards.

In FIG. 7 the conveyor is schematically illustrated. Components carrying boards 102 are shown on the conveyor moving in the direction of arrow A. Fan means 103 draws in ambient air shown by horizontal straight arrows such as arrow B and forces the air over heating elements such as heating element 104. The driven heated air depicted by the wavy arrows such as arrow C follows the contour of wall 106 up through vanes or baffles 101 which can be fixed to direct the heated air at any desired angle and direction. Preferably the air is driven in the direction of the conveyor and tangential to the boards. This provides the boards with a longer period of applied continuously moving convected heat.

Simultaneously with the exposure of the boards to the tangential convection currents, the boards are exposed to radiant heat and convection currents rising from the hotplate 15 heated by heating coils 104. These convection currents are illustrated by vertical arrow such as arrow D. The vertically rising convection currents are reinforced by the fan and venting arrangement of hood 26.

The switch 44 ideally controls the number of heating elements energized. Thus, when the conveyors are closer together and a smaller area of the heating station requires heat, particular elements are deenergized. Similarly, the fan means 103 may include more than one fan and the switch 44 could also control the number of fans operating.

In practice, the machine is turned on to start the heaters at the various stations. The solder in the pot at station 16, for example, is heated to melt the solidified solder. The temperatures are preset to desired levels and fans in the hood may be started.

One of the adjusting wheels 31 or 32 are manipulated to position the movable conveyor chain assembly to fit the size of boards being processed. The conveyor is actuated and boards fed into the slots on the oppositely disposed lugs 19 at a level commensurate with the wave amplitude and the height of the vertical plates.

The movement of the conveyor chain assembly 17 moves the masking equipment to cover those portions of the fluxer and solder orifice that are located below the movable conveyor assembly. At the same time the switch is actuated if the movable conveyor pushes against its operating arm. The operation of the switch removes power from selected heaters at station 14, for example.

The boards are carried by the conveyor system through the various stations where they are fluxed, uniquely preheated by tangentially and normally impinging heat waves simultaneously and soldered. No pallets are required. The conveyor is protected by the masking arrangements and the pots and their contents are also protected by the masking arrangement since they are integral to the pots. The power use efficiency is maximized by the features of this invention.

Additional means for controlling the power expended by the stations as a function to the size of the boards can be provided. That is, additional microswitches can be provided which can further control, for example, the number of fans used in the preheater of station 14. Also, it should be realized that the sliding maskers can save on flux and solder by covering the flux and solder when they are not being used. This aids in maintaining the purity of the solder and in reducing the amount of dross generated in the use of the molten solder.

While the principles of the invention have been described in connection with specific apparatus and applications, it is to be understood that this description is made only be way of example and not as a limitation on the scope of the invention.

I claim:

1. An automatic soldering machine having a plurality of processing stations, at least one of said stations comprising a soldering station including means for applying molten solder to articles being processed on said machine, said machine comprising a pair of cooperating conveyor chain assemblies mounted on opposite sides of said stations for holding said articles being processed on said machine, means for moving at least one of said conveyor chain assemblies for adjusting the distance between said conveyor chain assemblies to accommodate articles of different sizes, and means for controlling the power provided to at least one of said stations as a function of the size of the articles being processed.

2. The automatic soldering machines of claim 1 and masking means integral to at least an associated one of said plurality of stations for covering those portions of the associated station which is not being utilized because of the size of the articles being processed.

3. The automatic soldering machine of claim 2 wherein said stations are serially arranged on a table section of said machine, and wherein said means for moving said at least one of said conveyor chain assemblies comprises threaded rod means extending transverse to and below said table section, adjustable wheel means fixedly attached to said threaded rod means whereby turning said adjustable wheel means causes said threaded rod means to turn, carrier means threaded onto said threaded rod so that said carrier means is moved transverse to said table section when said threaded rod is turned, and means for attaching said movable conveyor chain assembly to said carrier means to move with said carrier means.

4. The automatic soldering machine of claim 3 wherein means are provided for transferring power to said movable conveyor means, said last-named means comprising drive shaft means positioned parallel to and spaced apart from said threaded rod, drive-gear means mounted on said drive shaft to rotate with said drive shaft but capable of sliding along said drive shaft, positioning bracket means mounted to said movable conveyor assembly for moving said drive gear to keep said drive gear positioned relative to said movable one of said conveyor chain assembly means, and driven-gear means on said movable conveyor means driven by said drive gear when positioned relative to movable one of said conveyor chain assembly means to drive said movable one of said conveyor chain assembly means.

5. The automatic soldering machine of claim 4 wherein said power controlling means includes switch means foe controlling the power provided to selected ones of said stations, and means for mounting said switch means to be operated by said movable conveyor assembly when moved to preselected positions.

6. The automatic soldering machine of claim 5 wherein said stations comprise a solder-fluxing station, said soldering station and a preheating therebetween, said preheating station comprising a plurality of heating coils, said heating coils being selectively energized by said switch means, and said heating station further comprising means for forcing heated air along the route of said articles conveyed by said conveyor chain assemblies.

7. An automatically adjustable soldering machine for use in soldering components to printed circuit boards, or the like, said machine comprising a multiprocessing station table section having at least a molten-solder-bath-processing station thereon, first and second conveyor assemblies mounted on opposite sides of said stations for transporting substantially flat panels having any one of a plurality of widths past said stations, at least one of said conveyor assemblies being adjustably movable to fit said any one of a plurality of widths, and masking means integral with said movable assembly and located in at least one of said processing stations for covering portions of said one of said stations responsive to the movement of said assembly.

8. The automatic soldering machine of claim 7 wherein said soldering station comprises solder orifice means enabling said molten solder to be raised to contact said boards, a pair of oppositely disposed walls defining said orifice means, said masking means comprising sliding-plate means shaped to cooperate with said walls for slidingly covering selected portions of said solder orifice, and front-plate means attached to said sliding-plate means to complete the masking of said solder-orifice means.

9. An automatic soldering machine for use in soldering components to printed circuit boards, or the like, said machine comprising a table section having thereon a plurality of processing stations including a molten-solder-bath-processing station, first and second conveyor assemblies mounted on opposite sides of said stations to support and move said printed circuit boards, masking means integral to at least one of said processing stations for covering portions of said one of said stations, a fluxing station included among said stations, said fluxing station comprising flux-orifice means for enabling flux to be raised to contact said boards, a pair of oppositely disposed walls defining said flux-orifice means, said masking means comprising automatically movable sliding-plate means shaped to cooperate with said walls for slidingly covering selected portions of said flux orifice, and front-plate means attached to said sliding-plate means to complete the masking of said flux-orifice means.

10. An automatic soldering machine for use in soldering components to printed circuit boards, or the like, said machine comprising a table section having thereon a plurality of processing stations including a molten-solder-bath-processing station, pivot and conveyor assemblies mounted on opposite sides of said stations, said first conveyor assembly being movable, masking means integral to at least one of said processing stations for covering portions of said one of said stations, and means for moving said masking means responsive to the movement of said movable conveyor assembly.

11. The automatic soldering machine of claim 10 wherein switch means are provided for controlling the power provided to at least some of said stations, and means for operating said switch means responsive to the movement of said movable conveyor means to certain preselected position.

12. The automatic soldering machine of Claim 11 wherein said processing stations comprise a solder fluxing station, a soldering station and a preheating station therebetween, said preheating station comprising a plurality of heating coils, said heating coils being selectively energized by said switch means, and said heating station further comprising means for forcing heated air along the route of the printed circuit boards, or the like, conveyed by said conveyor assemblies.